United States Patent
Carothers

(10) Patent No.: US 8,656,052 B2
(45) Date of Patent: Feb. 18, 2014

(54) SYSTEMS AND METHODS OF MAPPED NETWORK ADDRESS TRANSLATION

(75) Inventor: Matthew Edwin Carothers, Dunwoody, GA (US)

(73) Assignee: Cox Communications, Inc., Atlanta, GA (US)

( * ) Notice: Subject to any disclaimer, the term of this patent is extended or adjusted under 35 U.S.C. 154(b) by 237 days.

(21) Appl. No.: 13/108,912

(22) Filed: May 16, 2011

(65) Prior Publication Data

US 2012/0297089 A1 Nov. 22, 2012

(51) Int. Cl.
*G06F 15/16* (2006.01)

(52) U.S. Cl.
USPC ........................................................ 709/245

(58) Field of Classification Search
USPC .................................. 709/245, 246, 222, 236
See application file for complete search history.

(56) References Cited

U.S. PATENT DOCUMENTS

2002/0083199 A1* 6/2002 Dingsor et al. ............... 709/245
2009/0154464 A1* 6/2009 Kim et al. ..................... 370/392

OTHER PUBLICATIONS

P. Srisuresh et al., NAT Terminology and Considerations RFC 2663, Aug. 1999.*
G. Tsirtsis et al., Network Address Translation—Protocol Translation (NAT-PT), RFC 2766, Jun. 1999.*
F. Audet et al., NAT Behavioural Requirements for Unicast UDP, RFC 4787, Oct. 2006.*

\* cited by examiner

*Primary Examiner* — Mark Rinehart
*Assistant Examiner* — Ellen A Kirillova
(74) *Attorney, Agent, or Firm* — Benjamin A. Balser; Balser & Grell IP Law

(57) ABSTRACT

A private customer IP address is mapped to a public NAT address using a repeatable, reversible algorithm. A given private IP address must always map to the same public IP address and a fixed range of source ports. In the mapped address translation (MAT) implementation, private IP addresses are mapped to public IP/port ranges by borrowing bits from the 16 bit port number.

18 Claims, 4 Drawing Sheets

| SUBNET | NETWORK/HOST(BINARY) | PORT (BINARY) |
|---|---|---|
| 192.168.38.186 | 11000000 10101000 00100110 10111010 | |
| 24.248.74.38:47616 | 00011000 11111000 01001010 00100110 | 1011101000000000 |
| 24.248.74.38:47871 | 00011000 11111000 01001010 00100110 | 1011101011111111 |

FIG. 5

SYSTEMS AND METHODS OF MAPPED NETWORK ADDRESS TRANSLATION

TECHNICAL FIELD

The present disclosure is generally related to electronics and, more particularly, is related to mapping computer network addresses.

BACKGROUND

In computer networking, network address translation (NAT) is the process of modifying IP address information in IP packet headers while in transit across a traffic routing device. The simplest type of NAT provides a one to one translation of IP addresses. The Internet Engineering Task Force Request for Comment #2663 (RFC 2663) refers to this type of NAT as basic NAT. RFC2663 defines NAT as a method by which IP addresses are mapped from one realm to another, in an attempt to provide transparent routing to hosts. Traditionally, NAT devices are used to connect an isolated address realm with private unregistered addresses to an external realm with globally unique registered addresses. This document attempts to describe the operation of NAT devices and the associated considerations in general, and to define the terminology used to identify various flavors of NAT.

In this type of NAT only the IP addresses and checksums need to be changed. The rest of the packet can be left untouched (at least for basic TCP/UDP functionality, some higher level protocols may need further translation). Basic NATs can be used when there is a requirement to interconnect two IP networks with incompatible addressing.

However it is common to hide an entire IP address space, usually consisting of private IP addresses, behind a single IP address (or in some cases a small group of IP addresses) in another (usually public) address space. To avoid ambiguity in the handling of returned packets a one to many NAT must alter higher level information such as TCP/UDP ports in outgoing communications and must maintain a translation table so that return packets can be correctly translated back. RFC 2663 uses the term NAPT (network address and port translation). Other names for this type of NAT include PAT (port address translation), IP masquerading and NAT Overload. Since this is the most common type of NAT it is often referred to simply as NAT.

As described, the method enables communication through the router only when the conversation originates in the masqueraded network, since this establishes the translation tables. For example, a web browser in the masqueraded network can browse a website outside, but a web browser outside could not browse a web site in the masqueraded network. However, most NAT devices today allow the network administrator to configure translation table entries for permanent use. This feature is often referred to as "static NAT" or port forwarding and allows traffic originating in the "outside" network to reach designated hosts in the masqueraded network.

In the mid-1990s NAT became a popular tool for alleviating the consequences of IPv4 address exhaustion. It has become a standard, indispensable feature in routers for home and small-office Internet connections. Most systems using NAT do so in order to enable multiple hosts on a private network to access the Internet using a single public IP address.

Network address translation has serious drawbacks on the quality of Internet connectivity and requires careful attention to the details of its implementation. In particular all types of NAT break the originally envisioned model of IP end-to-end connectivity across the Internet and NAPT makes it difficult for systems behind a NAT to accept incoming communications. As a result, NAT traversal methods have been devised to alleviate the issues encountered. There are heretofore unaddressed needs with previous solutions.

SUMMARY

Example embodiments of the present disclosure provide systems of systems and methods of mapped network address translation. Briefly described, in architecture, one example embodiment of the system, among others, can be implemented as follows: memory for storing an algorithm; and a server configured to receive a packet with a source internet protocol (IP) address of X length, the source IP address with N bits reserved for network identification and M bits reserved for host identification, where M is equal to X−N; and translate the source IP address to a mapped IP address of length X, the mapped IP address with P bits reserved for network identification and Q bits reserved for host identification, wherein Q<M and the translating is performed with the algorithm.

Embodiments of the present disclosure can also be viewed as providing methods for systems and methods of mapped network address translation. In this regard, one embodiment of such a method, among others, can be broadly summarized by the following steps: receiving a packet with a source internet protocol (IP) address of X length, the source IP address with N bits reserved for network identification and M bits reserved for host identification, where M is equal to X−N; and translating the source IP address to a mapped IP address of length X, the mapped IP address with P bits reserved for network identification and Q bits reserved for host identification, wherein Q<M and the translating is performed with a mathematical algorithm.

BRIEF DESCRIPTION OF THE DRAWINGS

FIG. 5 is a table of an example embodiment of a method of mapped network address translation.

DETAILED DESCRIPTION

Figure 1:
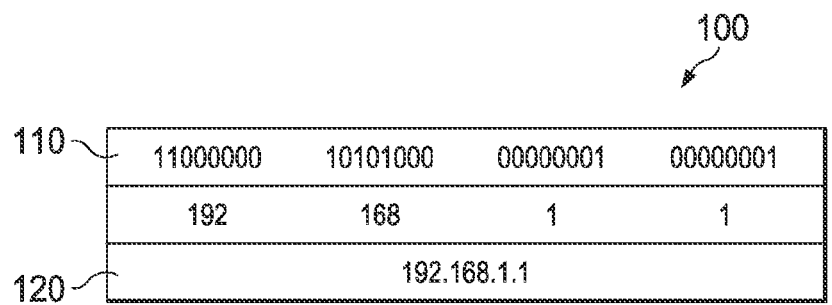
FIG. 1 is a table of internet protocol (IP) address nomenclature.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The majority of NATs map multiple private hosts to one publicly exposed IP address. In a typical configuration, a local network uses one of the designated "private" IP address subnets (RFC 1918). A router on that network has a private address in that address space. The router is also connected to the Internet with "public" address(es) assigned by an Internet service provider. As traffic passes from the local network to the Internet, the source address in each packet is translated on the fly from the private address to a public address. The router tracks basic data about each active connection (particularly the destination address and port). When a reply returns to the router, it uses the connection tracking data it stored during the outbound phase to determine where on the internal network to forward the reply on packet return.

All Internet packets have a source IP address and a destination IP address. Typically packets passing from the private network to the public network will have their source address modified while packets passing from the public network back to the private network will have their destination address modified. More complex configurations are also possible.

To avoid ambiguity in how to translate returned packets further modifications to the packets are required. The vast bulk of Internet traffic is TCP and UDP packets and for these protocols the port numbers are changed so that the combination of IP and port information on the returned packet can be unambiguously mapped to the corresponding private address and port information. Protocols not based on TCP or UDP require other translation techniques. ICMP packets typically relate to an existing connection and need to be mapped using the same IP and port mappings as that connection.

There are several ways of implementing network address and port translation. In some application protocols that use IP address information, the application running on a node in the masqueraded network needs to determine the external address of the NAT, i.e., the address that its communication peers detect, and, furthermore, often needs to examine and categorize the type of mapping in use. Usually this is done because it is desired to set up a direct communications path (either to save the cost of taking the data via a server or to improve performance) between two clients both of which are behind separate NATs. For this purpose, the Simple traversal of UDP over NATs (STUN) protocol was developed (RFC 3489, Mar. 2003). It classified NAT implementation as full cone NAT, (address) restricted cone NAT, port restricted cone NAT or symmetric NAT and proposed a methodology for testing a device accordingly. However, these procedures have since been deprecated from standards status, as the methods have proven faulty and inadequate to correctly assess many devices. New methods have been standardized in RFC 5389 (Oct. 2008) and the STUN acronym now represents the new title of the specification: Session Traversal Utilities for NAT.

TCP/IP and UDP/IP sessions on the internet are uniquely identified by four pieces of information: Source IP address, Source Port, Destination IP address, and Destination Port. An IPv4 (Internet Protocol Version 4) address is a 32 bit integer that uniquely identifies a host. A port is a 16 bit integer that uniquely identifies a process running on a host. For example, a web browser on a computer might connect to a web server on another computer. The two computers are identified by their IP addresses, and the web browser and server software are identified by port numbers. The source port used by the browser would be randomly assigned by the computer's operating system. The destination port used by the server is usually standardized.

As provided in FIG. 1, 32 bit IP addresses are commonly expressed as four 8 bit integers, referred to as a "dotted quad" for ease of reading. As a non-limiting example, IP address 110 is expressed in binary as: 11000000101010000000000100000001. By breaking the 32 bits of IP address 110 into 8 bit chunks (11000000/10101000/00000001/00000001) and converting them to decimal, we get a much more readable number in decimal IP address 120: 192.168.1.1.

Because an IP address uniquely identifies a computer, an Internet Service Provider (ISP) can use it to identify subscribers for purposes of network security or answering law enforcement (LE) requests, for example. Each ISP must keep a log of which subscriber was using a given IP address at a particular time. Then when the ISP receives a subpoena with an IP and a timestamp, it can identify the subscriber and comply with the request.

Figure 2:
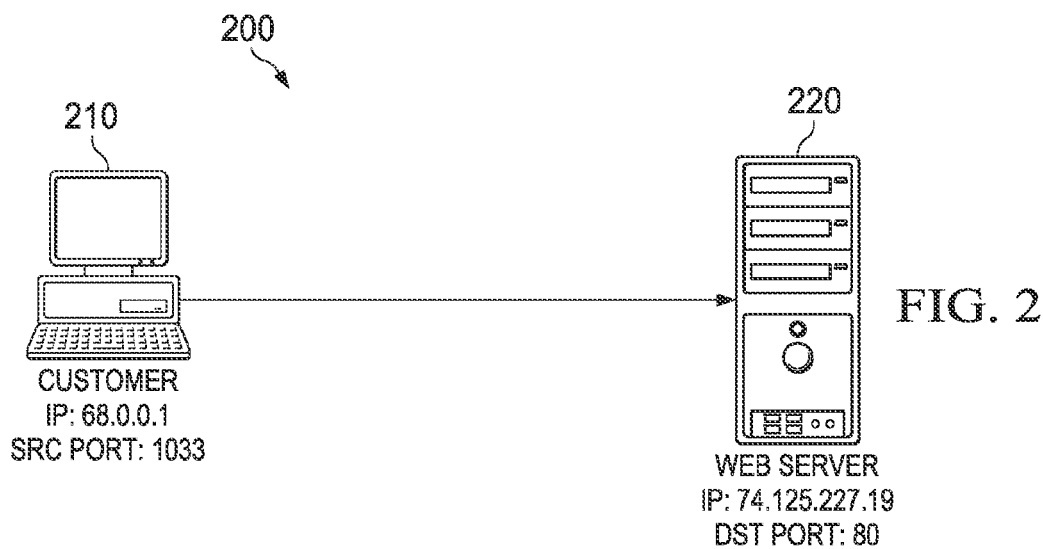
FIG. 2 is a system diagram of a one to one network.

Because there are a finite number of IP addresses available on the internet, many users employ a technique called Network Address Translation (NAT), which allows multiple devices to reach the internet through a single IP. As shown in network system 200 of FIG. 2, customer 210 communicates with web server 220. In this example, customer 210 sends a transmission from IP address 68.0.0.1 with source port 1033 to IP address 74.125.227.19 with destination port 80. There is no identification problem in this one to one transmission configuration.

Figure 3:
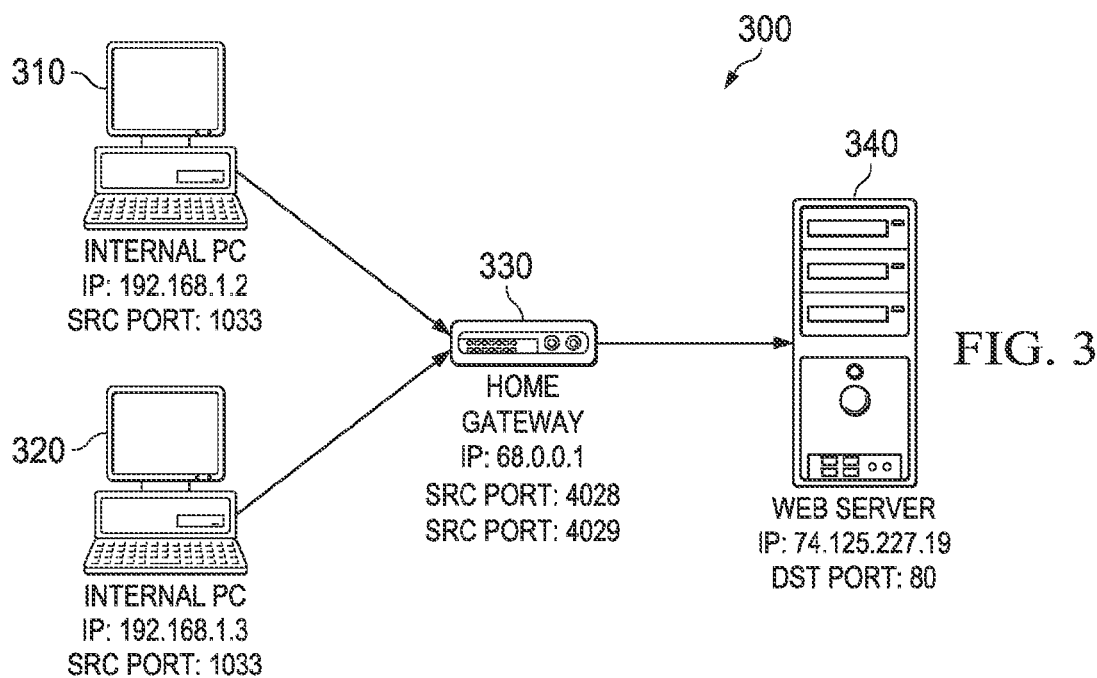
FIG. 3 is a system diagram of a network using address translation.

FIG. 3 provides network 300 with a home gateway 330 between web server 340 and a plurality of PCs 310, 320. First PC 310 sends a communication from IP address 192.168.1.2 to web server 340 with IP address 74.125.227.19 using source port 1033. Gateway 330 then rewrites the source of the communication to its own public IP address of 68.0.0.1 using a different source port 4028. Gateway 330 then sends the communication to web server 340 with IP address 74.125.227.19 with destination port 80. Second PC 320 sends a communication from IP address 192.168.1.3 to web server 340 with IP address 74.125.227.19 using source port 1033. Gateway 330 then rewrites the source of the communication to its own public IP address of 68.0.0.1 using a different source port 4029. Gateway 330 then sends the communication to web server 340 with IP address 74.125.227.19 with destination port 80. The problem with the present situation, in which there are more PCs than available IP addresses, involves a lack of transparency of the source of a communication. An address translation is performed when a communication is routed through a gateway that has the effect of hiding the originating PC.

NAT is typically performed within an individual subscriber's home. The public IP address used is still unique to a single subscriber, and thus the ISP can still address security incidents and answer LE requests. As ISPs transition to IPv6, the next version of the Internet Protocol, the old IPv4 addresses will run out. ISPs will still need to support IPv4 connectivity even as v4 IP addresses dwindle, and, thus, they will need to implement Large Scale NAT (LSN). Large Scale NAT, sometimes referred to as Carrier Grade NAT is simply NAT in an ISP network for a large number of customers.

LSN introduces security problems because an IP address is no longer unique to a single customer. With multiple customers accessing outside sites via a single IP address, ISPs can no longer act on security complaints or respond to LE requests. Solutions proposed thus far revolve around logging all traffic at the NAT gateway, which would be extremely expensive at the very least, and possibly even technically infeasible.

Most NAT implementations choose a random public IP address from a pool and a random source port for a given outbound connection. This effectively masks the identity of the subscriber behind the NAT pool. In order to address security complaints or act on LE requests, NAT routers may employ a new strategy. A private customer IP address is mapped to a public NAT address using a repeatable, reversible algorithm. A given private IP address must always map to the same public IP address and a fixed range of source ports. This technique is referred to herein as Mapped Address Translation (MAT).

A 32 bit binary IP address consists of two parts: the network part and the host part. The first N bits designate what network a host resides on, and the rest identify an individual host on that network. For a network of N=24, an example notation is:

24.248.74.0/24

Written in binary, the first twenty-four bits identify the network, and the last eight bits identify the host: 00011000 11111000 01001010/00000000

Figure 4:
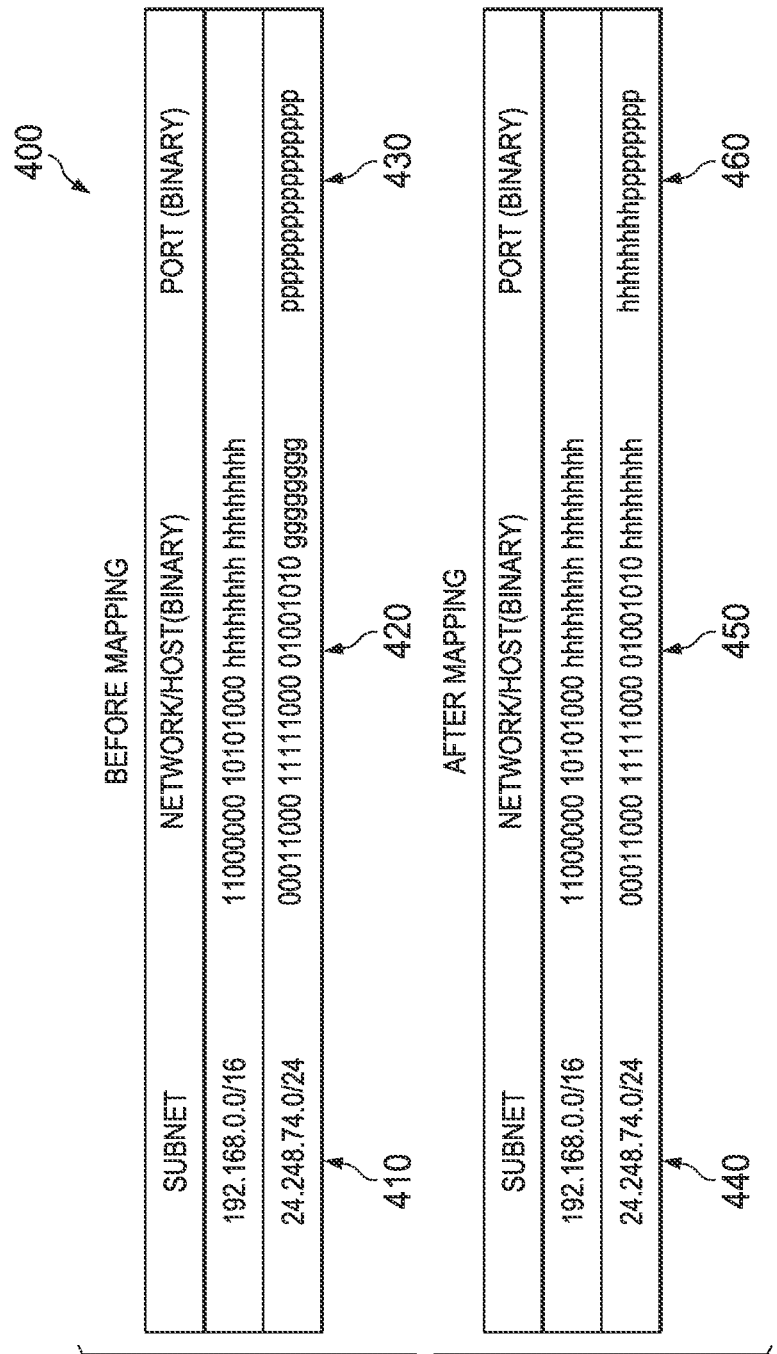
FIG. 4 is a table of an example embodiment of a method of mapped network address translation.

NAT allows one to map a large private network to a small public network. In this example, 192.168.0.0/16 (16 bit host portion, 65535 hosts) is NAT'ed to 24.248.74.0/24 (8 bit host portion, 255 hosts). In a normal NAT configuration, connections from the private network are translated to the public IP/port combinations either in a random fashion or as a round robin. In the MAT implementation, private IP addresses are mapped to public IP/port ranges by borrowing bits from the 16 bit port number as shown in FIG. 4. FIG. 4 includes mapped address translation 400 with pre-mapped subnet address 410, pre-mapped network/host address 420, pre-mapped port 430, post-mapped subnet address 440, post-mapped network/host address 450, and post-mapped port 460. Before the MAT, port 430 is a 16 bit address of pppppppppppppppp. After the MAT, port 460 is a 16 bit address of hhhhhhhhpppppppp.

Because the host portion of the private subnet is 16 bits long and the host portion of the public subnet is 8 bits long, 8 bits from pre-mapped port address 430 are used in the post-mapped port address 460. Then 8 bits remain in the least significant bits of port address 460, which yields a range of $2^8$=255 ports.

As a specific example, 192.168.38.186 is mapped into 24.248.74.0/24 in mapped address translation 500 of FIG. 5. Subnet address 510 of 192.168.38.186 maps to 24.248.74.38 in the source port range from 47616 to 47871. The 16 bits representing the host portion of the 192.168.38.186 address are moved into the host portion of the 24.248.74.38 address. Because the host portion of 24.248.74.38 is only 8 bits long, only the first 8 bits of 192.168.38.186's host portion fit into it. The remaining 8 bits overwrite the first 8 bits of the 16 bit port number. Any LE request or security report relating to traffic from 24.248.74.38 on a source port in that range can be tied back to the customer's private IP address of 192.168.38.186, the assignment of which an ISP logs through its existing mechanisms.

So if, for example, a particular IP address is 1.1.1.1, and the device at that address connects to a web server located at IP address 2.2.2.2, to communicate, the destination port that the web server software is listening on is determined. In an example embodiment, the connecting device may select a unique 16 bit source port to identify the connection. Web servers may typically listen on port 80. A transmission packet might go out addressed as:

1.1.1.1:1085->2.2.2.2:80 where the source address is 1.1.1.1 and the source port is 1085. The destination address of the packet is 2.2.2.2, and the destination port is 80.

The return traffic from the web server goes to the port that the connecting device used when it initiated the connection, so a reply packet may be returned addressed as:

2.2.2.2:80->1.1.1.1:1085 where the source address is 2.2.2.2 and the source port is 80. The destination address of the packet is 1.1.1.1, and the destination port is 1085.

Source ports are typically sequential, but they might be random. E.g. the next connection might have a source port of 1086. In a typical NAT situation, the source and port numbers are both rewritten to whatever the NAT router has available. In an example implementation, a device has IP address 192.168.0.2 behind a NAT router, a packet is sent out as 192.168.0.2:1091->9.9.9.9:80 and the NAT router's public IP is 8.8.8.8. In previous systems, the NAT router would send a packet on the connecting device's behalf addressed as:

8.8.8.8:2489->9.9.9.9:80

The destination IP address and port stay the same, but the source IP address and port are different. The NAT router then maintains a table that remembers that 192.168.0.2:1091 maps to the randomly chosen 8.8.8.8:2489, so any return packets back be forwarded back to that private IP address.

However, in the disclosed systems and methods of mapped address translation, the source IP address and port are not chosen randomly. They are chosen deterministically based on the private source IP address. An example embodiment of a mathematical algorithm to do so is to shift the host portion of the bits of the source IP into the host portion of the public IP and public source port. The host portion of the private IP has more bits than the host portion of the public IP because the private subnet is larger (more hosts), so the excess bits are shifted into the port number instead. That has the effect of locking the potential source ports on the public side down to a range.

In an example embodiment in dotted decimal notation, a source network address is 192.168.0.0/16 and the hosts are in the form 192.168.A.B, where A and B are from 0 to 255. A public network address is 24.248.72.0/24 and the hosts are in the form 24.248.72.C, where C is from 0 to 255. Let the source port be symbolized as P. In a traditional NAT, C and P would be chosen at random such that 192.168.A.B maps to 24.248.72.C:P where C and P are random and do not depend on A or B. In example embodiments of systems and methods of mapped address translation, C and P depend on A and B. So, in an example, 192.168.A.B is mapped to 24.248.72.A with source port of B, where C becomes A and the first 8 bits of the port number are set to B. The last 8 bits of the port number may be chosen sequentially, randomly, or by a formulaic method. Overwriting the left most 8 bits of P with B achieves a range from (B*255)+0 to (B*255)+255.

Figure 6:
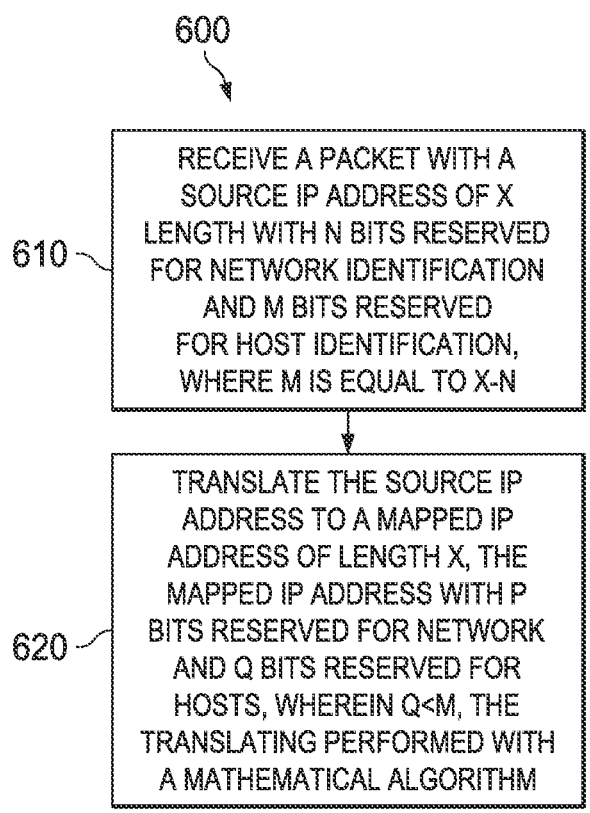
FIG. 6 is a flow diagram of an example embodiment of a method of mapped network address translation.

FIG. 6 provides flowchart 600 of an example embodiment of a method of mapped network address translation. In block 610, a packet with a source internet protocol (IP) address of X length is received. The source IP address has N bits reserved for network identification and M bits reserved for host identification, where M is equal to X−N. In block 620, the source IP address is translated to a mapped IP address of length X and a range of source ports. The mapped IP address has P bits reserved for network identification and Q bits reserved for host identification, wherein Q<M, the translating performed with a mathematical algorithm.

The flow chart of FIG. 6 shows the architecture, functionality, and operation of a possible implementation of mapped address translation software. In this regard, each block may represent a module, segment, or portion of code, which comprises one or more executable instructions for implementing the specified logical function(s). It should also be noted that in some alternative implementations, the functions noted in the blocks may occur out of the order noted in FIG. 6. For example, two blocks shown in succession in FIG. 6 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved.

In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present disclosure has been described in detail, it should be understood that various changes, substitutions and alterations can be made thereto without departing from the spirit and scope of the disclosure as defined by the appended claims.

Therefore, at least the following is claimed:

1. A method comprising:
    receiving a packet with a source internet protocol (IP) address of X length, the source IP address with N bits reserved for network identification and M bits reserved for host identification, where M is equal to X−N; and
    translating the source IP address to a mapped IP address of length X and a range of source ports, the mapped IP address with P bits reserved for network identification and Q bits reserved for host identification, wherein Q<M and the translating is performed with a mathematical algorithm.

2. The method of claim 1, wherein the mathematical algorithm provides that a given source IP address always results in the same mapped IP address and the same range of port numbers.

3. The method of claim 2, wherein the mathematical algorithm is reversible.

4. The method of claim 1, wherein the host portion of the mapped IP address and the most significant bits of the mapped source port are overwritten with the host identification.

5. The method of claim 1, wherein the translating occurs within a gateway device.

6. The method of claim 5, wherein the gateway device performs mapped translation for a plurality of devices in a network.

7. A system for mapping internet protocol (IP) addresses comprising:
    memory for storing an algorithm; and
    a server configured to
    receive a packet with a source internet protocol (IP) address of X length, the source IP address with N bits reserved for network identification and M bits reserved for host identification, where M is equal to X−N; and
    translate the source IP address to a mapped IP address of length X and a range of source ports, the mapped IP address with P bits reserved for network identification and Q bits reserved for host identification, wherein Q<M and the translating is performed with the algorithm.

8. The system of claim 7, wherein the algorithm is a mathematical algorithm that provides that a given source IP address always results in the same mapped IP address and the same range of port numbers.

9. The system of claim 8, wherein the mathematical algorithm is reversible.

10. The system of claim 7, wherein the host portion of the mapped IP address and the most significant bits of the mapped source port are overwritten with the host identification.

11. The system of claim 7, further comprising a gateway device for performing the translating.

12. The system of claim 11, wherein the gateway device performs mapped translation for a plurality of devices in a network.

13. A computer readable medium comprising instructions for performing a method, the method comprising:
    receiving a packet with a source internet protocol (IP) address of X length and a range of source ports, the source IP address with N bits reserved for network identification and M bits reserved for host identification, where M is equal to X−N; and
    translating the source IP address to a mapped IP address of length X and a range of source ports, the mapped IP address with P bits reserved for network identification and Q bits reserved for host identification, wherein Q<M and the translating is performed with a mathematical algorithm.

14. The computer readable medium of claim 13, wherein the mathematical algorithm provides that a given source IP address always results in the same mapped IP address and the same range of port numbers.

15. The computer readable medium of claim 14, wherein the mathematical algorithm is reversible.

16. The computer readable medium of claim 13, further comprising instruction for overwriting the host portion of the mapped IP address and the most significant bits of the mapped source port with the host identification.

17. The computer readable medium of claim 13, wherein the translating instructions are performed within a gateway device.

18. The computer readable medium of claim 17, wherein the gateway device performs mapped translation for a plurality of devices in a network.

* * * * *